United States Patent

Himuro

[11] Patent Number: 6,123,129
[45] Date of Patent: Sep. 26, 2000

[54] PNEUMATIC RADIAL TIRE INCLUDING FALSE DIVIDING GROOVE

[75] Inventor: Yasuo Himuro, Tachikawa, Japan

[73] Assignee: Bridgestone Corporation, Tokyo, Japan

[21] Appl. No.: 09/226,126

[22] Filed: Jan. 7, 1999

[30] Foreign Application Priority Data

Jan. 14, 1998 [JP] Japan .................................. 10-006001

[51] Int. Cl.$^7$ ........................ B60C 11/11; B60C 107/00; B60C 115/00
[52] U.S. Cl. ................................ 152/209.15; 152/209.28
[58] Field of Search ........................ 152/209.15, 209.19, 152/209.22, 209.28

[56] References Cited

U.S. PATENT DOCUMENTS

| | | |
|---|---|---|
| 580,070 | 4/1897 | Welch . |
| 4,690,189 | 9/1987 | Bradisse et al. . |
| 5,109,903 | 5/1992 | Watanabe et al. . |
| 5,609,699 | 3/1997 | Himuro . |
| 5,707,461 | 1/1998 | Himuro . |
| 5,714,021 | 2/1998 | Ochi . |
| 5,885,384 | 3/1999 | Himuro . |

FOREIGN PATENT DOCUMENTS

| | | |
|---|---|---|
| 713789 | 5/1996 | European Pat. Off. . |
| 5-319025 | 12/1993 | Japan . |

*Primary Examiner*—Steven D. Maki
*Attorney, Agent, or Firm*—Sughrue, Mion, Zinn, Macpeak & Seas, PLLC

[57] ABSTRACT

A pneumatic radial tire for passenger car has a directional tread pattern (with respect to a rotating direction of tire) defined by a circumferential center groove, a plurality of directional slant grooves disposed at intervals in the circumferential direction of the tire, and a plurality of blocks formed at intervals in both circumferential and axial directions of the tire, in which these blocks form a pair of central block rows and a pair of side block rows, and surfaces of acute corner portions of blocks constituting the central block row and the side block row located outward and inward in the axial direction of the tire at given length, and chamfered acute corner portions of blocks constituting the central block row and the side block row are connected to each other at their chamfered shallowest tips.

5 Claims, 2 Drawing Sheets

PNEUMATIC RADIAL TIRE INCLUDING FALSE DIVIDING GROOVE

BACKGROUND OF THE INVENTION

1. Field of the Invention

This invention relates to pneumatic tires, and more particularly to a pneumatic radial tire for passenger car having a directional tread pattern. The tread pattern is defined by a circumferential center groove continuously extending in parallel to a circumferential direction of the tire or substantially in parallel thereto, a plurality of directional slant grooves disposed at intervals in the circumferential direction of the tire and extending obliquely with respect to the circumferential direction of the tire, and a plurality of blocks formed at intervals in both circumferential and axial directions of the tire and having an acute corner portion. The rotating direction of the tire in the mounting onto a vehicle is specified to firstly contact a portion of the directional slant groove extending toward a side of an equatorial plane of the tire with ground and lately contact a portion thereof far away from the equatorial plane with ground.

Throughout the specification, the term "directional slant groove" means a groove extending obliquely in the circumferential direction and forming so-called directional tread pattern wherein the rotating direction (forward running direction) of the tire in the mounting onto a vehicle is specified so as to firstly contact a portion of such a groove extending toward a side of an equatorial plane of the tire with ground and lately contact a portion thereof far away from the equatorial plane with ground.

2. Description of Related Art

Recently, the pneumatic radial tire for passenger car is demanded to have a high drainage performance in the running on wet road surface as compared with the conventionally known tires.

In order to enhance the drainage performance in the running on wet road surface, there is proposed and used a pneumatic tire having a directional tread pattern defined by a plurality of circumferential grooves disposed at intervals in an axial direction of the tire and extending in parallel to or substantially in parallel to the circumferential direction of the tire, a plurality of directional slant grooves disposed at intervals in the circumferential direction of the tire and extending obliquely in the circumferential direction of the tire to open to the circumferential grooves, and a plurality of blocks formed at intervals in both circumferential and axial directions of the tire, and specifying the rotating direction of the tire in the mounting onto a vehicle is specified to firstly contact a portion of such a groove extending toward a side of an equatorial plane of the tire with ground and lately contact a portion thereof far away from the equatorial plane with ground. In this case, the circumferential grooves are used for drainage in the front and rear directions and the slant grooves are used for drainage in lateral direction.

In such a tire, however, the circumferential grooves and the slant grooves extending in different directions with respect to the circumferential direction of the tire intersect with each other, so that water flows collide with each other at such intersect portions to cause disorder of the water flow or create bubbles and finally a high drainage performance is not obtained.

Also, if it is intended to enhance the drainage performance in the running on wet road surface in the conventional tire, it tends to cause a problem of degrading the steering stability in the running on dry road surface.

SUMMARY OF THE INVENTION

It is, therefore, an object of the invention to solve the afore-mentioned problems of the conventional technique and to provide a pneumatic radial tire for a passenger car having excellent drainage performance in the running on wet road surface by preventing or controlling the occurrence of water flow disorder or bubbles without degrading the steering stability in the running on dry road surface.

According to the invention, there is the provision of a pneumatic radial tire for passenger car having a directional tread pattern defined by a circumferential center groove continuously extending in parallel to a circumferential direction of the tire or substantially in parallel thereto, a plurality of directional slant grooves disposed at intervals in the circumferential direction of the tire and extending obliquely with respect to the circumferential direction of the tire, and a plurality of blocks formed at intervals in both circumferential and axial directions of the tire and having an acute corner portion, provided that a rotating direction of the tire in the mounting onto a vehicle is specified to firstly contact a portion of the directional slant groove extending toward a side of an equatorial plane of the tire with ground and lately contact a portion thereof far away from the equatorial plane with ground, in which (1) these blocks form a pair of central block rows arranged on both sides of the equatorial plane in a central zone of the tread and a pair of side block rows arranged at an outside of each of the central block rows in the axial direction of the tire; (2) a surface of an acute corner portion of a block constituting the central block row, which is located outward in the axial direction of the tire, and a surface of an acute corner portion of a block constituting the side block row, which is located inward in the axial direction of the tire, are chamfered to gradually shallow from a tip of the corner portion toward a width-widening part thereof and to make a chamfering depth of the tip shallower than a depth of the directional slant groove; and (3) an acute corner portion of a block constituting the central block row located outward in the axial direction of the tire and an acute corner portion of a block constituting the side block row located inward in the axial direction of the tire are connected to each other at their chamfered shallowest tips to from a false dividing groove between the central block row and the side block row.

In a preferable embodiment of the invention, the acute corner portion of the block has an angle of 10–60°, and the surface of the corner portion of the block is chamfered from the tip thereof in the longitudinal direction of the block over a distance at least longer than the depth of the directional slant groove.

In another preferable embodiment of the invention, a surface of an acute corner portion of a block constituting the central block row located inward in the axial direction of the tire is chamfered so as to gradually shallow from a tip of the corner portion toward a width-widening part thereof.

In the other preferable embodiment of the invention, the central block row is arranged on a circumference at a block density corresponding to one half of that of the side block row, and the side block row is constructed by alternately arranging a block connected to each block of the central block row and an independent block not connected to the block of the central block row.

BRIEF DESCRIPTION OF THE DRAWINGS

The invention will be described with reference to the accompanying drawings, wherein.

DESCRIPTION OF PREFERRED EMBODIMENTS

Figure 1:
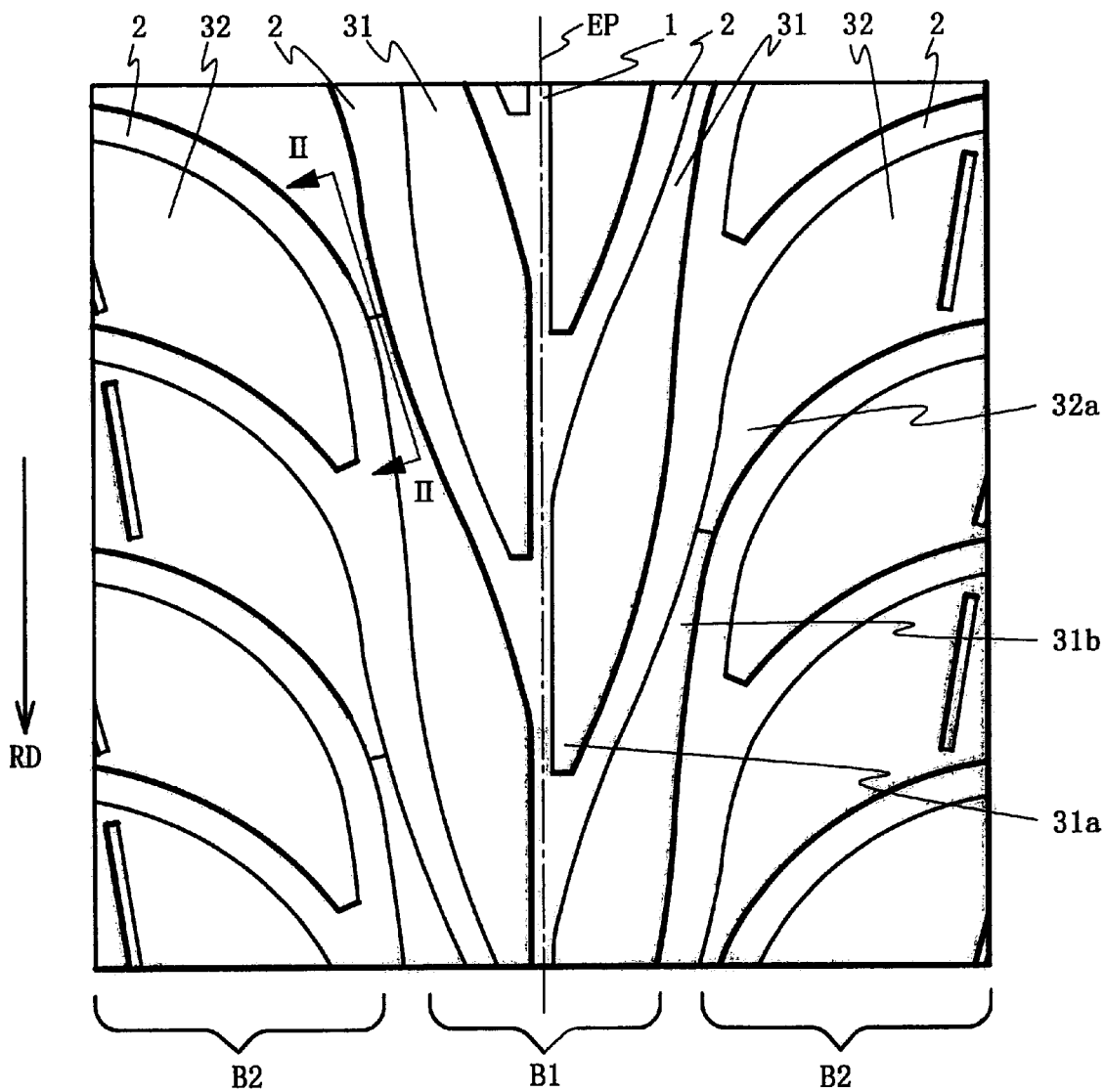
FIG. 1 is a partly enlarged plan view of a tread pattern in an embodiment of the pneumatic radial tire according to the invention.

The pneumatic radial tire according to the invention has the above-mentioned structure, and particularly has a structure that the acute corner portion of the block constituting the central block row located outward in the axial direction of the tire and the acute corner portion of the block constituting the side block row located inward in the axial direction of the tire stand face to face and are connected each other at their chamfered tips. As a result water flowing along stepping-in side edge and kicking-out side edge of the block constituting the central block row can flow along stepping-in side edge and kicking-out side edge of the block constituting the side block row at approximately an equal amount without disordering at a junction between the stepping-in side and the kicking-out side to smoothly discharge from an opening end of the tread.

In the pneumatic radial tire according to the invention, the false dividing groove is formed between the central block row and the side block row by chamfering the surface of the acute corner portion of the block constituting the central block row located outward in the axial direction and the surface of the acute corner portion of the block constituting the side block row located inward in the axial direction to gradually shallow from the tip of the corner portion toward width-widening part thereof and to make the chamfering depth of the tip shallower than the depth of the directional slant groove. Next, the acute corner portion of the block constituting the central block row located outward in the axial direction is connected to the acute corner portion of the block constituting the side block row located inward in the axial direction of the tire at their chamfered shallowest tips. Such a false dividing groove forms a guide line for the water flow in the groove bottom portion, so that the water flowing along the stepping-in side edge and kicking-out side edge of the block constituting the central block row can flow along the stepping-in side edge and kicking-out side edge of the block constituting the side block row before water is excessively mixed at the false dividing groove to attain the effect of controlling the disorder of the water flow.

In the pneumatic radial tire according to the invention, it is favorable that the acute corner portion having an angle of 10–60° is formed in the block. When the angle of the acute corner portion exceeds 60°, an effect of mitigating a resistance of water film in the stepping into wet road surface is lost. When the angle is less than 10°, the block rigidity considerably lowers. In the pneumatic radial tire according to the invention, the block rigidity is particularly important because a large lateral input is applied to the acute corner portion located at the outside of the tread in the cornering. Therefore, it is preferable to make the angle of the acute corner portion as large as possible.

In the invention, the surface of the acute corner portion of the block is particularly chamfered from the tip thereof in the longitudinal direction of the block over a distance at least longer than the depth of the directional slant groove. In this case, the effect of mitigating the resistance of the water film in the stepping into wet road surface becomes larger and also the block rigidity is sufficiently ensured.

FIG. 1 illustrates a partly enlarged plan view of a tread pattern in the pneumatic radial tire according to the invention. This tire as a tire size of 205/50R16 and a tread width TW of 170 mm.

As shown in FIG. 1, the tire according to the invention comprises a circumferential center groove 1 continuously extending in parallel to a circumferential direction of the tire, a plurality of directional slant grooves 2 arranged at intervals in the circumferential direction of the tire and extending obliquely with respect to the circumferential direction of the tire, and a plurality of blocks 31, 32 formed at intervals in both circumferential and axial directions of the tire. Each of the blocks has an acute corner portion, and has a directional tread pattern specifying a rotating direction RD of the tire in the mounting onto a vehicle to firstly contact a portion of the directional slant groove 2 extending toward a side of an equatorial plane EP of the tire with ground and lately contact a portion thereof far away from the equatorial plane EP with ground.

The blocks 31 form a pair of central block rows B1 arranged on both sides of the equatorial plane EP in a central zone of the tread, while the blocks 32 form a pair of side block rows B2 arranged at an outside of each of the central block rows B1 in the axial direction of the tire. An acute corner portion 31b having an angle of 15° is formed at the block 31 outward in the axial direction of the tire. An acute corner portion 32a having an angle of 25° is formed at the block 32 inward in the axial direction of the tire.

Figure 2:
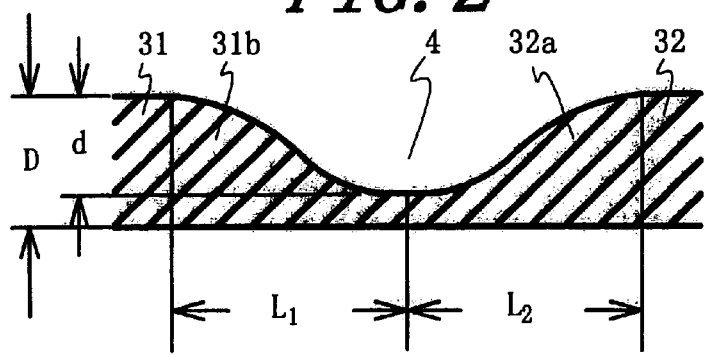
FIG. 2 is a partly section view taken along a line II—II of FIG. 1.

As shown in FIG. 2, the surface of the acute corner portion 31b of the block 31 constituting the central block row B1 located outward in the axial direction of the tire and the surface of the acute corner portion 32a of the block 32 constituting the side block row B2 located inward in the axial direction of the tire are chamfered to gradually shallow from their tips toward width-widening part. In this case, a chamfering depth d in the tip is 5 mm and a groove depth D of the directional slant groove 2 is 8 mm, so that the chamfering depth d of the tip is made shallower than the groove depth D of the directional slant groove 2.

The acute corner portion 31b of the block 31 constituting the central block row B1 located outward in the axial direction is connected to the acute corner portion 32a of the block 32 constituting the side block row B2 located inward in the axial direction at their shallowest tip parts formed by chamfering. As a result a false dividing groove 4 is formed between the central block row B1 and the side block row B2.

Since chamfering lengths L1, L2 in the acute corner portions 31b, 32a of the blocks 31, 32 are 20 mm, respectively, the surfaces of the corner portions 31b, 32a are chamfered over a distance longer than the groove depth D (8 mm) of the directional slant groove 2 from their tips in the longitudinal direction of the block.

Also, the surface of the corner portion 31a of the block 31 constituting the central block row B1 located inward in the axial direction of the tire is chamfered to gradually shallow from its tip toward width-widening part likewise the case of chamfering the surface of the corner portion 31b.

In the central block row B1, the blocks 31 are arranged at a block density corresponding to one half of the block density in the side block row B2. Thus the side block row B2 is constructed by alternately arranging a block 32 connected to each block 31 of the central block row B1 and an independent block 32 not connected to the block 31 of the central block row B1.

Figure 3:
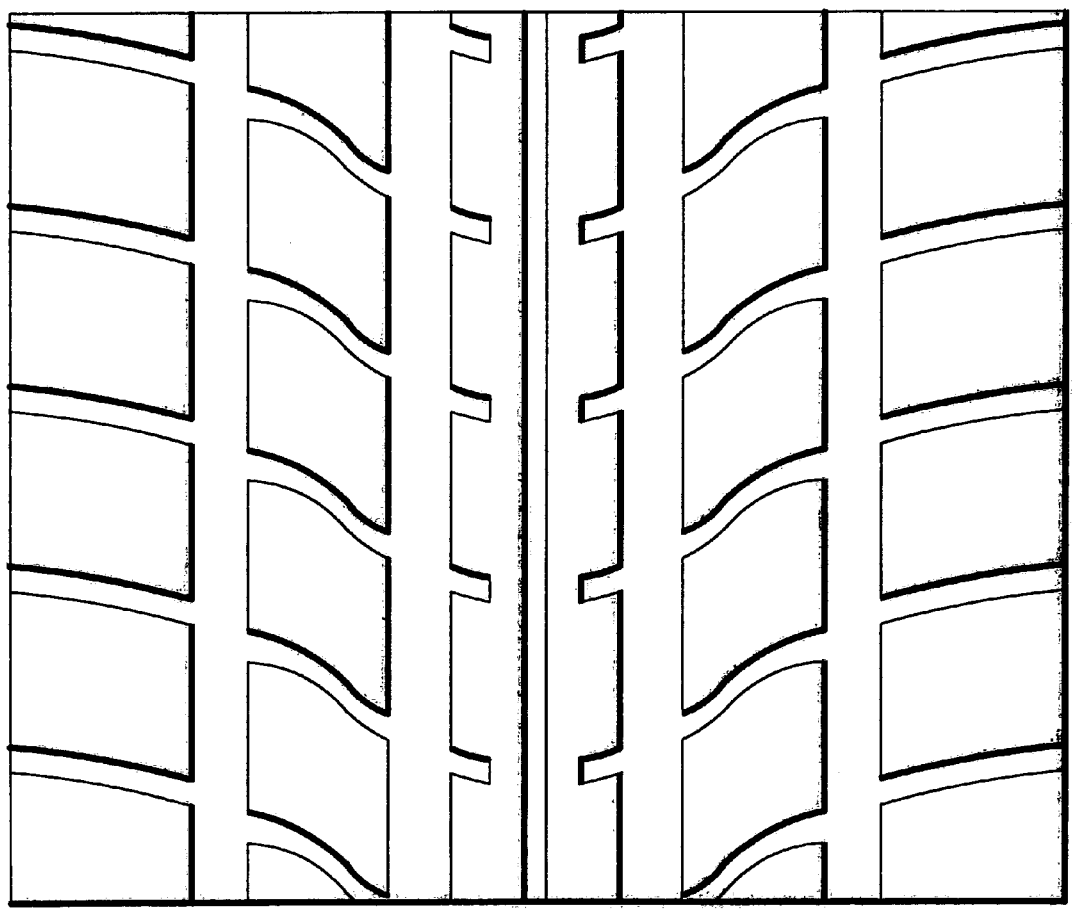
FIG. 3 is a partly enlarged plan view of a tread pattern in the conventional tire.

FIG. 3 illustrates a partly enlarged plan view of a tread pattern in the conventional tire. This tread pattern of the conventional tire is defined by five circumferential grooves extending straightforward in the circumferential direction and a plurality of slant grooves extending obliquely with respect to the circumferential direction to form a plurality of blocks at intervals in both circumferential and axial directions of the tire.

Tests for evaluating the resistance to hydroplaning during straight running and cornering on wet road surface and the steering stability in the running on dry road surface are carried out with respect to the example tire according to the invention and the conventional tire.

The resistance to hydroplaning during straight running on wet road surface is evaluated by a driver's feeling on a hydroplaning limit speed in the straight running on a road surface having a water depth of 5 mm.

The resistance to hydroplaning during cornering is evaluated by measuring lateral gravity of hydroplaning limit when the vehicle is turned on a road surface having a water depth of 5 mm at a radius of 80 m.

The steering stability on dry road surface is evaluated by a driver's feeling when the tire is run on a circuit course of dry state at various sporty modes.

The measured results are represented by an index on the basis that the conventional tire is 100 and shown in Table 1. The larger the index value, the better the property.

TABLE 1

|  | Conventional tire | Example tire |
|---|---|---|
| Resistance to hydroplaning in straight running | 100 | 120 |
| Resistance to hydroplaning in cornering | 100 | 115 |
| Steering stability on dry road surface | 100 | 105 |

As seen from the above results, the invention provides a pneumatic radial tire for passenger car having excellent drainage performance on wet road surface without lowering the steering stability on dry road surface.

What claimed is:

1. A pneumatic radial tire for passenger car having a directional tread pattern defined by a circumferential center groove continuously extending in parallel to a circumferential direction of the tire or substantially in parallel thereto, a plurality of directional slant grooves disposed at intervals in the circumferential direction of the tire and extending obliquely with respect to the circumferential direction of the tire, and a plurality of blocks formed at intervals in both circumferential and axial directions of the tire and having an acute corner portion, provided that a rotating direction of the tire in the mounting onto a vehicle is specified so as to firstly contact a portion of the directional slant groove extending toward a side of an equatorial plane of the tire with ground and lately contact a portion thereof far away from the equatorial plane with ground, in which (1) these blocks form a pair of central block rows arranged on both sides of the equatorial plane in a central zone of the tread and a pair of side block rows arranged at an outside of each of the central block rows in the axial direction of the tire; (2) a surface of an acute corner portion of a block constituting the central block row, which is located outward in the axial direction of the tire, and a surface of an acute corner portion of a block constituting the side block row, which is located inward in the axial direction of the tire, are chamfered so as to gradually shallow from a tip of the corner portion toward a width-widening part thereof and to make a chamfering depth of the tip shallower than a depth of the directional slant groove; and (3) an acute corner portion of a block constituting the central block row located outward in the axial direction of the tire and an acute corner portion of a block constituting the side block row located inward in the axial direction of the tire are connected to each other at their chamfered shallowest tips to from a false dividing groove between the central block row and the side block row.

2. A pneumatic radial tire according to claim 1, wherein the acute corner portion of the block has an angle of 10–60°.

3. A pneumatic radial tire according to claim 1, wherein the surface of the corner portion of the block is chamfered from the tip thereof in the longitudinal direction of the block over a distance at least longer than the depth of the directional slant groove.

4. A pneumatic radial tire according to claim 1, wherein a surface of an acute corner portion of a block constituting the central block row located inward in the axial direction of the tire is chamfered so as to gradually shallow from a tip of the corner portion toward a width-widening part thereof.

5. A pneumatic radial tire according to claim 1, wherein the central block row is arranged on a circumference at a block density corresponding to a half of that of the side block row, and the side block row is constructed by alternately arranging a block connected to each block of the central block row and an independent block not connected to the block of the central block row.

* * * * *